Oct. 29, 1968

C. A. WEBER 3,408,552

AUTOMATIC PROTECTION CIRCUIT FOR REMEDIABLE
SHORT CIRCUIT IN LOAD

Filed April 9, 1965

INVENTOR.
CHARLES A. WEBER
BY Moody & Hallacher

ATTORNEYS

United States Patent Office
3,408,552
Patented Oct. 29, 1968

3,408,552
AUTOMATIC PROTECTION CIRCUIT FOR REMEDIABLE SHORT CIRCUIT IN LOAD
Charles A. Weber, Marion, Iowa, assignor to Collins Radio Company, Cedar Rapids, Iowa, a corporation of Iowa
Filed Apr. 9, 1965, Ser. No. 446,873
5 Claims. (Cl. 321—14)

ABSTRACT OF THE DISCLOSURE

A protection circuit for automatically and momentarily removing the supply voltage from a load which experiences a remediable short circuit. A silicon controlled rectifier in an AC or DC converter normally conducts every other half-cycle and allows the converter to provide a DC voltage to the load. Means responsive to a momentary short circuit in the load prevents the silicon rectifier from conducting thereby preventing the functioning of the converter during one of said alternate half-cycles.

---

This invention relates to a device for automatically protecting an electronic load from burning out when a short circuit occurs within said load.

It is frequently desirable to provide a means for automatically and momentarily removing a voltage supply from electronic equipment in case of remediable failure of said equipment. Many available prior art systems possess the disadvantages of slow reaction time in detecting the short and also the disadvantage of requiring manual resetting upon correction of the deficiencies in the electronic equipment.

It is therefore an object of this invention to provide a circuit which automatically and rapidly removes the supply voltage momentarily from electronic equipment which has shorted or "hung up."

It is another object of this invention to provide such a circuit which automatically resumes operation upon correction of the faulty equipment.

It is another object of this invention to provide such a circuit which rapidly and automatically accomplishes said functions without the requirement of manual operations.

Figure 1:
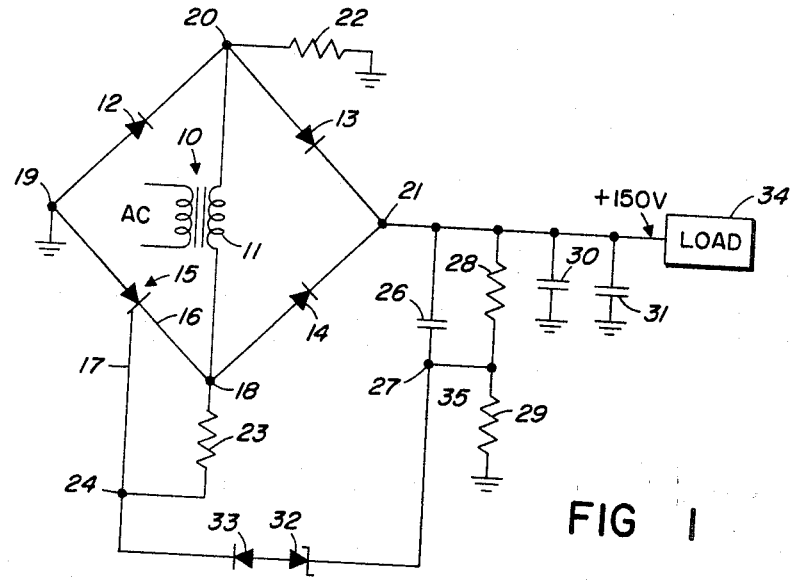
Figure 2:
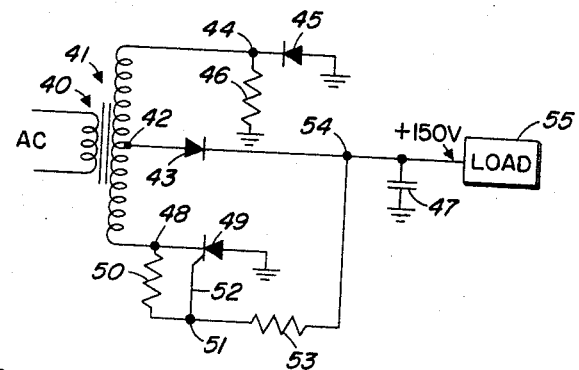

Further objects, features and advantages of the invention will become apparent from the following description and claims when read in view of the accompanying drawings, in which:

FIGURE 1 shows one preferred embodiment in which a diode bridge is utilized, and FIGURE 2 shows a second preferred embodiment.

Consider now FIGURE 1 which shows a diode bridge containing identical diodes 12, 13, and 14 in three legs thereof and a silicon controlled rectifier (SCR) 15 in the fourth leg thereof. An alternating current is supplied by a transformer 10, the secondary 11 of which is connected between junctions 18 and 20 of said bridge. Junction 19 of said bridge is grounded and junction 21 receives the output from said bridge. Junction 20 is grounded through resistor 22. The cathode 16 of SCR 15 is connected to junction 18 of the bridge. The gate 17 of SCR 15 is connected to junction 18 through resistor 23. The junction 24 of resistor 23 and gate 17 is connected to output 21 through back-to-back diodes 32 and 33 and capacitor 26. Diodes 32 and 33 can be replaced with a gas bulb or a resistor. Also connected to output 21 is a voltage dividing network comprising resistors 28 and 29 and a parallel capacitance network comprising capacitors 30 and 31. The output is fed to load 34 which is the electronic equipment desired to be protected—for example, a modulator.

In operation, capacitors 30 and 31 are charged to the transformer voltage through diodes 12 and 14. For the purpose of illustration, the output voltage appearing at junction 21 is assumed to be +150 volts.

Capacitor 26 is also charged by the 150 volt bus so that junction 27 is at approximately 17 volts because of its connection 35 with the voltage divider. As the A.C. transformer output reverses polarity junction 20 of diodes 12 and 13 is held at ground by resistor 22. This causes cathode 16 and gate 17 of SCR 15 to become negative. Cathode 16 continues to go negative until current flows through junction 24, diodes 32 and 33 to capacitor 26. The SCR gate to cathode is biased on at this point and the cathode is held at approximately −30 volts. This forces junction 20 of the bridge to become positive until diode 13 is forward biased. With diode 13 forward biased SCR 15 turns on and cathode 16 goes to ground and capacitors 30 and 31 are charged in normal bridge fashion. If a short appears in load 34 the output voltage goes to zero. The 150 volt transient is translated by capacitor 26, the discharge of which causes junction 27 to go from +17 to −133 volts. Because of the potential required to break down diode 32 the cathode 16 of SCR 15 must assume a potential of −133 volts in addition to the voltage required to break down Zener 32 (by using a 47 v. Zener the voltage required is −180 v.). By designing the circuit such that the input voltage is less than this sum the SCR 15 cannot fire and no output voltage is available at the load 34 during the half-cycle when junction 20 is plus. It is therefore evident that no voltage will be available at load 34 during this half-cycle until the short is removed. During the next half-cycle (junction 20 −) there is an output available at load 34 and therefore the system goes into half-wave operation for the duration of the short. However, upon removal of the short normal operation as described hereinabove will be resumed. After resumption of normal operation any short in load 34 will again cause the circuit to shut off as described above. It is therefore evident that the circuit will automatically go into half-wave operation as a short appears in load 34. By using a fuse in the primary transformer 10, the fuse can be blown after a predetermined number of cycles of one-half wave operation. This is important when the short is such that it cannot be permanently removed from the load.

Consider now FIGURE 2 which shows another embodiment which accomplishes the substantially same results by use of a different circuit. The figure shows a transformer 40 having a center tap secondary 41, a junction 44 which is grounded through resistor 46 and diode 45. Diode 43 is connected to center tap 42 to provide an output voltage to load 55. Load 55 can be any electronic equipment desired to be protected from overload due to a short circuit. Again, for the sake of convenience, the output voltage appearing at load 55 is assumed to be +150 volts. The other end of secondary 41 is connected to silicon controlled rectifier 49 through junction 48. Resistor 50 connects junction 48 to gate 52 through junction 51. Resistor 53 connects junctions 51 and 54, and capacitor 47 connects junction 54 to ground. Resistor 53 can be replaced with back-to-back diodes or a gas bulb. In operation when junction 44 is positive it is held to ground by resistor 46. Junction 48 will be negative and therefore because of resistor 53 gate 52 of SCR 49 will be positive with respect to junction 48. Diode 43 feeds the output of secondary 41 to load 55 via junction 54. Because of the 150 volt potential at junction 54 the voltage appearing at junction 51 will be 150 volts minus the drop across resistor 53. Because junction 48 is going more negative the current flow through gate 52 increases until SCR 49 fires. At this time a power current flows from junction 48 to ground through the cathode and anode of SCR 49. This effects the grounding of junction 48 through SCR 49 and conduction is permitted thereby applying the 150 volt output to load 55. When junction 44 goes negative, on the next half-cycle, load 55 is grounded through diode 45. Because load 55 is grounded with junction 44 both positive and negative and also because diode 43 is connected to a center tap 42 of secondary 41 the potential applied to the load is always positive. If a short circuit appears in load 55 the voltage of junction 54 goes to zero. When junction 54 is at zero potential the net potential at junction 51 is decreased and the current through the gate of SCR 49 is insufficient to fire SCR 49. Resistor 53 is chosen such that the current passing through it is insufficient to fire the SCR 49 when the load is grounded and sufficient to fire it when the load is not grounded. This causes SCR 49 to shut off and thereby protect load 55 from burning out during this half-cycle. The output remains zero as long as junction 44 remains positive. When junction 44 swings negative load 55 is grounded by diode 45 and an output will be applied to load 55. However, when junction 44 again becomes positive the circuit will again shut off. It is therefore evident that with a short circuit present in load 55 the circuit goes into half-cycle operation. However, the effective current value of the half-cycle operation will be substantially less than that of full cycle operation and load 55 will be protected against burn out due to overload. As stated with respect to the embodiment of FIGURE 1, a fuse can be added to the primary of transformer 40. Capacitor 47 is a filtering capacitor for the output of junction 54.

Component values used in the tested circuits are:

| Reference Number | Component | Value |
| --- | --- | --- |
| 12, 13, 14, 43, 45 | Diode | IN 3189 |
| 15, 49 | SCR | TI W 301 |
| 22 | Resistor | 10K |
| 23 | do | 1K |
| 28 | do | 100K |
| 29 | do | 10K |
| 26 | Capacitor | 4 µf. |
| 30, 31 | do | 25 µf. |
| 32 | Zener | IN 977 |
| 33 | Diode | IN 649 |
| 46 | Resistor | 33K |
| 50 | do | 1K |
| 53 | do | 330K |
| 47 | Capacitor | 25 µf. |

Although this invention has been described with respect to particular embodiments thereof, it is not to be so limited, as changes and modifications may be made therein which are within the spirit and scope of the invention as defined by the appended claims.

I claim:
1. A protection circuit for automatically and momentarily removing the supply voltage from a load which experiences a remediable short circuit comprising
 (a) AC to DC converter means,
 (b) a current control element in said converter means, said element having conducting and nonconducting states and a control terminal for receiving a control voltage which changes said control element from the nonconducting state to the conducting state,
 (c) means for providing a control voltage to said control terminal during alternate half-cycles of an AC source during normal operation of the load, and
 (d) means responsive to a short circuit in said load for preventing the provision of a control voltage to said control terminal thereby preventing the functioning of said converter means during one of said alternate half-cycles.

2. A protection circuit as defined by claim 1 wherein said AC to DC converter means is a full-wave rectifier bridge and said current control element is a silicon controlled rectifier which forms one leg of said bridge.

3. A protection circuit as defined by claim 1 wherein said AC to DC converter means is a center tapped transformer and said current control element is a silicon controlled rectifier which connects one end terminal of the transformer secondary coil to ground.

4. A protection circuit as defined by claim 1 wherein said means for providing a control voltage to said control terminal includes capacitive means connected to the output of said converter means and said means for preventing the provision of a control voltage to said control terminal is a current limiting device connected between said capacitive means and said control terminal.

5. A protection circuit as defined by claim 4 wherein said current limiting device is selected from the group consisting of a resistor, back-to-back diodes, and a gas bulb.

References Cited

UNITED STATES PATENTS

| | | | |
| --- | --- | --- | --- |
| 3,211,929 | 10/1965 | Prines et al. | 317—33 |
| 3,253,189 | 5/1966 | Wouk | 317—33 |
| 3,256,448 | 6/1966 | Ogawa et al. | 317—33 |
| 3,309,602 | 3/1967 | Euvino et al. | 317—33 |
| 3,312,862 | 4/1967 | Currin | 317—33 |
| 3,323,017 | 5/1967 | Powell et al. | 317—33 |

LEE T. HIX, *Primary Examiner.*

MILTON O. HIRSHFIELD, *Examiner.*

R. V. LUPO, *Assistant Examiner.*